United States Patent [19]

Kruse et al.

[11] Patent Number: 4,828,810

[45] Date of Patent: May 9, 1989

[54] REMOVAL OF LOW LEVEL ETHYLENE OXIDE CONTAMINANTS BY TREATMENT OF CONTAMINATED GASES WITH CATIONIC EXCHANGE RESINS AT GAS-SOLID INTERFACE REACTION CONDITIONS

[75] Inventors: Richard J. Kruse, Flushing; David E. Hammer, Ann Arbor, both of Mich.

[73] Assignee: Advanced Air Technologies, Inc., Owosso, Mich.

[21] Appl. No.: 50,469

[22] Filed: May 18, 1987

[51] Int. Cl.$^4$ ................................................ B01J 8/00
[52] U.S. Cl. ................................................ 423/245.1
[58] Field of Search ........................................ 423/245

[56] References Cited

U.S. PATENT DOCUMENTS 3,851,043  11/1974  Gunther ........................... 423/245.5

Primary Examiner—Robert L. Stoll
Assistant Examiner—Adriana L. Eng
Attorney, Agent, or Firm—Peter J. Georges

[57] ABSTRACT

A method of removing low levels of ethylene oxide (1% by volume or less) from ethylene oxide contaminated gases is provided. The removal is effected by contacting the ethylene oxide with a solid, cationic ion exchange resin at conditions such that the quantity of water present in the reaction zone is at a level such that the reaction of the ethylene oxide with resin occurs at a gas-solid interface to form an ethylene oxide derivative polymer which is bound to said resin.

22 Claims, No Drawings

REMOVAL OF LOW LEVEL ETHYLENE OXIDE CONTAMINANTS BY TREATMENT OF CONTAMINATED GASES WITH CATIONIC EXCHANGE RESINS AT GAS-SOLID INTERFACE REACTION CONDITIONS

BACKGROUND OF THE INVENTION

This invention relates generally to a process for removing low levels of ethylene oxide from ethylene oxide contaminated gases using ion exchange resins at gas-solid interface reaction conditions providing rapid reaction rates and bound polymer reaction products, which are retained on the resins.

Removal of ethylene oxide from air is industrially important to maintain environmental quality and to protect workers' health. Various designs for scrubbers are commercially available, all working on the same principle: The gas mixture, containing traces of ethylene oxide, is contacted with water. The water contains a dissolved catalyst, typically a strong acid such as sulfuric acid, or a strong base. This catalyst promotes the reaction of ethylene oxide with water (hydrolysis) to form ethylene glycol, which is a relatively innocuous and non-volatile compound. This scrubbing liquor is reused until the process efficiency decreases beyond an acceptable limit, due to the accumulation of ethylene glycol; at this point, the pH of the liquor must be adjusted (neutralized) before disposal.

While acid scrubbers perform adequately for process streams with moderate levels of ethylene oxide in air, reduction of ethylene oxide concentrations below a few parts-per-million is generally impractical. Likewise, room air cleaning, which involves larger air volumes and lower concentrations of ethylene oxide, cannot be performed with wet scrubbing unless prohibitively large water flow rates and huge equipment are employed.

The other systems currently available for ethylene oxide removal are based upon adsorption on activated carbon. Activated carbons have reasonable capacity for ethylene oxide sorption at higher gas-phase concentrations, but below about 100 ppm their capacities are too low to be considered. Moreover, because ethylene oxide is retained on activated charcoal by comparatively weak retention forces of absorbtion, description may occur and the effectiveness of removal can vary unacceptably over time and under various conditions.

Ethylene oxide contaminant removal, at high levels, such as found in sterilizer effluents using exchange resins, is taught in U.S. Pat. No. 3,841,053, which discloses a system and method for the removal of ethylene oxide contaminants using gel-type ion exchange resins. In accordance with the method of U.S. Pat. No. 3,841,053, the presence of water is required. Water is present in such an amount that ethylene oxide is reacted with the resin at a liquid solid interface; that is the reaction is effected in a liquid phase.

Ion exchange resins have also been used in methods of 1,4-Dioxane synthesis (See e.g. U.S. Pat. No. 4,365,071 and German Pat. No. 2,430,355) wherein an ethylene oxide stream is reacted with the resin to form an intermediate product. In such processes, once again, the intermediate reaction involving the resin and ethylene oxide is effected in liquid phase.

Specifically, acidic sulphonated polystyrene resins have been used in the prior art to catalyze the formation of a liquid ethylene oxide product (ethylene glycol and polyglycol liquids) in the presence of water in order to quantitatively measure ethylene oxide exposure. (U.S. Pat. No. 4,423,005)

The art also teaches the use of ion exchange resins as catalysts in the high temperature gas-phase reactions of ethylene-oxide to form ethylene glycol.

The present invention is based on the discovery that low level ethylene oxide contaminants can be removed from a contaminated gas by reaction of the ethylene oxide with dried acidic ion exchange resins, by using, contrary to the prior art (U.S. Pat. No. 3,841,053)—a gaseous rather than liquid interface with the resin. By use of a gas-solid reaction interface, bound ethylene oxide polymer is rapidly formed and retained on the resin at the conditions of ethylene oxide removal.

In contrast to U.S. Pat. No. 4,423,005, this invention enlists ion exchange resins in systems where ethylene oxide and water concentrations are much more dilute than those encountered in sterilizer operations. In this regime, reaction products are formed which are largely bound to the resin, and water behaves as a rate inhibitor.

Much of the prior art described above depends upon ion exchange resins to catalyze reactions of ethylene oxide. In the present invention, ion exchange resins are employed, to a large extent, as solid phase reactants.

SUMMARY OF THE INVENTION

In accordance with the present invention, a method is provided for removing ethylene oxide from an ethylene oxide-containing gas containing a low level of ethylene oxide (less than about 1% by volume down to extremely low levels—extrapolation from data indicating removal of ethylene oxide by the mechanism of the present invention occurring down to levels of 500 ppb or even 50 ppb). The method comprises introducing the ethylene oxide-containing gas into a reaction zone containing a solid, cationic ion exchange resin, maintaining the humidity of the ethylene oxide-containing gas and the water content of the resin within said reaction zone at a level such that, the reaction of a substantial portion of the ethylene oxide occurs in contact with the resin at a gas-solid interface, forming an ethylene oxide derivative polymer which is bound to said resin. Preferably, (1) the ethylene oxide-containing gas is air having an ethylene oxide content of from about 1 ppm to about 1000 ppm; (2) the resin is a strong-acid, cationic, acid form ion exchange resin in macroporous or macroreticular form, most preferably, a cross-linked polystyrene resin with sulfonic acid functionality; (3) the relative humidity of said ethylene oxide-containing gas is less than 50%; and, (4) the temperature at which the ethylene oxide-containing gas is reacted with the solid resin is in the range of 75° F.±25° F.

In accordance with another embodiment of the invention, a method of purifying air containing less than about 1%, by volume, ethylene oxide and having a relative humidity of less than about 85% is provided, which comprises treating a strong-acid, cationic, macroporous or macroreticular ion exchange acid-form resin in wet form or partially wet form (greater than about 25% by wt. water) by passing air, which does not contain ethylene oxide and which has a relative humidity of less than about 50%, through said resin to remove water from said wet form and/or partially wet form resin. After drying, air contaminated with low levels of ethylene oxide is passed into a reaction zone containing the dried resin. The humidity of the air and the water content of the resin within the reaction zone are maintained at a level at which the reaction of ethylene oxide gas, in contact with the resin, occurs at a gas-solid interface. The ethylene oxide-containing gas, in contact with the solid resin, forms an ethylene oxide derivative polymer which is bound to the resin. In this way ethylene oxide is removed from the gas being treated.

Yet another embodiment of the present invention involves removing ethylene oxide from an ethylene oxide-containing gas containing less than about 1% by volume, ethylene oxide, and having a relative humidity measured at 75° F. of less than 50% which comprises introducing the ethylene oxide-containing gas into a reaction zone containing a solid, acid-form, cationic, macroporous or macroreticular ion exchange resin which has a water content in equilibrium with the humidity of the gas being treated. At least a substantial portion of the ethylene oxide-containing gas is contacted with the surface of the dried resin, at gaseous-solid interface reaction conditions, to form an ethylene oxide derivative polymer which is bound to said resin. Gas which has been contacted with said dry resin is recovered from the reaction zone.

Preferably, (1) the ethylene oxide-containing gas is air having an ethylene oxide content of from about 1 ppm to about 1000 ppm; (2) the resin is cross-linked polystyrene resin with sulfonic acid functionality; (3) the relative humidity of the ethylene oxide-containing gas, measured at 75° F., is less than 25%; and, (4) the water content of the resin is about 20% by wt. or less.

A yet further embodiment of the invention provides a method of purifying air containing less than about 1%, by volume, ethylene oxide and a relative humidity measured at 75° F. of less than 50%. Acid-form, cationic, macroporous or macroreticular ion exchange resin in wet, or partially wet, form is placed into a reaction zone having an inlet end and an outlet end; air, which does not contain ethylene oxide and which has a relative humidity, measured at 75° F., of less than 50%, is passed through the reaction zone to dry the resin. The resin is dried to a level where the water content is less than the water content of an identical resin in equilibrium with the water content of air having a relative humidity measured at 75° F. of less than 50%. After the drying step, ethylene oxide-containing air is passed into the reaction zone and the water content of the dried resin within said reaction zone is maintained in equilibrium with the humidity of the ethylene oxide-containing air. The ethylene oxide-containing air contacts the surface of the resin and an ethylene oxide derivative polymer bound to the resin is formed. Air with ethylene oxide is removed from the reaction zone.

Preferably, the ethylene oxide-containing air being treated (1) contains ethylene oxide in an amount of from about 1 ppm to about 1000 ppm; (2) the resin comprises a cross-linked polystyrene resin with sulfonic acid functionality; (3) the relative humidity of the ethylene oxide-containing air, measured at 75° F., is less than 25%; and, (4) the water content of the resin is less than about 20% by wt.

DETAILED DESCRIPTION OF THE INVENTION

The method of low level ethylene oxide contamination removal of the present invention has four critical parameters of operation.

First, the ethylene oxide contaminant content of the gas being treated is about 1% by volume or less.

Second, the resin is a strong acid, cationic, ion exchange resin, in acid (hydrogen) form.

Third, the ethylene oxide contaminant is contacted with the resin at gas-solid contact reaction conditions. To achieve and maintain such conditions, the relative humidity of the ethylene oxide contaminated gas must be less than about 85%, preferably less than about 50% and, most preferably, about 25% or less. The water content of the resin (in dried state, the resins useful in the present invention contain at least about 15% by wt. water) must be maintained at a level that does not interfere with the required two-phase, gas-solid interface reaction conditions. Acceptable water contents for the resin vary, based upon other reaction parameters. A water content of the resin of less than about 20% by wt. is suitable under anticipated gas-solid interface reaction conditions.

The required gas-solid interface may be achieved by achieving and maintaining a resin water content in equilibrium with the moisture content of the gases being treated.

Resins in the wet state (50% by wt. water) are unsuitable for the present invention and although moderate levels of water content can be tolerated—though, not necessarily with equivalent results—it is critical that the level of the moisture in the gas being treated and the water content of the resin are such that the reaction of ethylene oxide contaminant and resin substantially occurs at a gas-solid interface.

It is critical that at least a majority, and preferably about 75% or more, of the ethylene oxide reaction products are generated by reaction at the gas-solid interface of resin and contaminated gas. It is important because the rate of reaction achieved at such conditions is markedly more rapid than at conditions allowing for high levels of hydrolysis and/or liquid-solid interface reaction conditions. It has been observed that, under the reaction parameters of the present invention, contrary to what is suggested by the results reported in the ion exchange resin catalyzed methods of the prior art, as the level of water content increases, the rate of reaction diminishes. Thus, where ethylene oxide is reacted in the presence of an ion exchanage resin, in accordance with the present invention, at about 85% relative humidity measured at 75° F., ethylene oxide removal is unsatisfactory, rather than enhanced. Although not wishing to be bound, it is believed that at the conditions promoting high levels of gas-liquid interface reaction of ethylene oxide, rapid reaction and product composition are such that even at low levels of contamination, the probability of ethylene oxide reaction, upon contact with the resin, is maximized and the solid product formed by gas-solid interface reaction is retained on the resin surface more strongly than gas-liquid and/or hydrolysis products.

In accordance with the present invention, the contact between resin and contaminated gas can be achieved using a fixed bed/packed bed filter arrangement or alternative solid-gas contact procedures, such as fluidized beds, etc. The fixed bed ethylene oxide removal capacity is about 1 lb. of ethylene oxide/1 lb. of resin. The means of effecting intimate contact between solid and gaseous reactants well known to the art may be used to effect contact in the present invention.

The following example will further illustrate the present invention:

EXAMPLE

A bed of dry DOWEX M-31 measuring one foot in depth, with a cross section for flow of ten square feet is used to remove ethylene oxide from air. The air is at 75° F., has a Relative Humidity of 15%, and contains ten parts per million of ethylene oxide (by volume). The air is fed to the bed continuously at a rate of 1000 cubic feet per minute. The effluent from the bed will be free of ethylene oxide for approximately 100 days, at which point the concentration in the effluent will begin to build. After 170 days, the bed's capacity for ethylene oxide will be completely exhausted.

For the treatment with Dowex M-31, operating at temperatures near 75° F., a relative humidity less than approximately 50% provides optimal reaction conditions with best results observed as the level of relative humidity is lowered; a relative humidity range of approximately 50 to 85% provides sub-optimal performance; a relative humidity greater than about 85% is unsatisfactory.

The detailed description set forth is the preferred embodiment of the method of the present invention. However, certain changes may be made in carrying out the above method without departing from the scope of the invention; it is therefore intended that all matter contained in the above description shall be interpreted as illustrative and not in a limited sense. It is also to be understood that the following claims are intended to cover all of the generic and specific features of the invention herein described, and all statements of the scope of the invention, which as a matter of language, might be said to fall therebetween.

We claim:

1. A method for removing ethylene oxide from an ethylene oxide-containing gas containing less than about 1% by volume ethylene oxide, which comprises:
   a. introducing said ethylene oxide-containing gas into a reaction zone containing a solid, acid-form cationic ion exchange resin;
   b. maintaining relative humidity of the ethylene oxide-containing gas and the water content of the resin within said reaction zone at a level such that, the reaction of ethylene oxide in contact with the resin occurs at a gas-solid interface;
   c. contacting said ethylene oxide-containing gas with said solid resin to form an ethylene oxide derivative polymer which is bound to said resin and a treated gas from which ethylene oxide has been removed; and
   d. withdrawing said treated gas from said reaction zone.

2. The method of claim 1 wherein the ethylene oxide-containing gas comprises air having an ethylene oxide content of from about 1 ppm to about 1000 ppm.

3. The method of claim 1 wherein said resin comprises a cationic, acid form ion exchange resin in macroporous or macroreticular form.

4. The method of claim 2 wherein said resin comprises a cationic, acid form ion exchange resin in macroporous or macroreticular form.

5. The method of claim 3 wherein said resin is a cross-linked polystyrene resin with sulfonic acid functionality.

6. The method of claim 4 wherein said resin is a cross-linked polystyrene resin with sulfonic acid functionality.

7. The method of claim 2, wherein the Relative Humidity of said ethylene oxide gas is less than 50%.

8. The method of claim 3, wherein the Relative Humidity of said ethylene oxide gas is less than 50%.

9. The method of claim 4, wherein the Relative Humidity of said ethylene oxide gas is less than 50%.

10. The method of claim 5, wherein the Relative Humidity of said ethylene oxide gas is less than 50%.

11. The method of claim 6, wherein the Relative Humidity of said ethylene oxide gas is less than 50%.

12. The method of claim 7 wherein the temperature at which the ethylene oxide-containing gas is reacted with the solid resin is in the range of 75° F.±25° F.

13. The method of claim 8 wherein the temperature at which the ethylene oxide-containing gas is reacted with the solid resin is in the range of 75° F.±25° F.

14. The method of claim 9 wherein the temperature at which the ethylene oxide-containing gas is reacted with the solid resin is in the range of 75° F.±25° F.

15. The method of claim 10 wherein the temperature at which the ethylene oxide-containing gas is reacted with the solid resin is in the range of 75° F.±25° F.

16. The method of claim 11 wherein the temperature at which the ethylene oxide-containing gas is reacted with the solid resin is in the range of 75° F.±25° F.

17. A method for removing ethylene oxide from an ethylene oxide-containing gas containing less than about 1% by volume ethylene oxide, and having a Relative Humidity measured at 75° F. of less than 50% which comprises:
   a. introducing said ethylene oxide-containing gas into a reaction zone containing a solid, acid-form, cationic, macroporous or macroreticular dry ion exchange resin and having a water content in equilibrium with the humidity of the gas being treated;
   b. contacting said ethylene oxide-containing gas with the surface of said dry resin, said contact being effected at a gaseous-solid interface, to form an ethylene oxide derivative polymer which is bound to said resin;
   c. withdrawing gas which has been contacted with said dry resin from said reaction zone.

18. The method of claim 17 wherein said ethylene oxide-containing gas comprises air having an ethylene oxide content of from about 1 ppm to about 1000 ppm.

19. The method of claim 17 wherein said resin comprises a cross-linked polystyrene resin with sulfonic acid functionality.

20. The method of claim 17 wherein Relative Humidity of the ethylene oxide-containing gas measured at 75° F. is less than 25%.

21. The method of claim 18 wherein Relative Humidity of the ethylene oxide-containing gas measured at 75° F. is less than 25%.

22. The method of claim 19 wherein Relative Humidity of the ethylene oxide-containing gas measured at 75° F. is less than 25%.

* * * * *